United States Patent [19]

Hudson

[11] Patent Number: 5,013,415
[45] Date of Patent: May 7, 1991

[54] LIQUID PURIFICATION SYSTEM

[76] Inventor: Wilbur N. Hudson, 4733 E. Grandview Rd., Phoenix, Ariz. 85032

[21] Appl. No.: 350,934

[22] Filed: May 12, 1989

[51] Int. Cl.⁵ .................. C02F 1/46; C10G 17/06
[52] U.S. Cl. ................... 204/152; 204/149; 204/276
[58] Field of Search ............ 204/152, 149, 276

[56] References Cited

U.S. PATENT DOCUMENTS

| | | | |
|---|---|---|---|
| 1,038,122 | 9/1912 | Hagg | 204/152 |
| 1,080,826 | 12/1913 | Gibson | 204/152 |
| 1,102,808 | 12/1914 | Bull | 204/149 |
| 3,563,879 | 3/1967 | Richards et al. | 204/272 |
| 4,268,399 | 5/1981 | Box, Jr. et al. | 210/762 |
| 4,525,253 | 6/1985 | Hayes et al. | 204/149 |

Primary Examiner—John F. Niebling
Assistant Examiner—Arun Phasge
Attorney, Agent, or Firm—Warren F. B. Lindsley

[57] ABSTRACT

Recirculating water is pumped through a coarse filter and then through a fine filter, ionization cells and catalytic water converter with a first portion of the water being diverted at the coarse filter to simultaneously clean its exposed surface and backwash its filtering material during a filtering action.

9 Claims, 2 Drawing Sheets

LIQUID PURIFICATION SYSTEM

BACKGROUND OF THE INVENTION

This invention relates to liquid purification and more particularly to improved apparatus and methods of operation for the filtration, ionization and catalytically handling of water used in cooling towers and other industrial cooling devices.

DESCRIPTION OF THE PRIOR ART

Recirculated water for large refrigeration or building cooling systems is subject to mineralization, microorganism and algae growth. Such problems are due in part to the high operating temperatures of such systems promoting accelerated growth and chemical reaction. The result is a frequent need to clean operating parts of the circulating system, sometimes requiring expensive disassembly and/or replacement of elements such as filters, heat exchangers, pumps and the like.

During the warmer season in particular, the water must be checked almost daily to determine the pH level and the chemical content. Unless these factors are carefully controlled, the growth of bacteria and algae in the water will be excessive with the result that health hazards are produced.

The foregoing routines are expensive and time consuming and if not followed corrective measures must be taken which are even more expensive to implement since they involve deterioration and replacement of parts of the apparatus.

Although purification systems for reusable water are known, none disclose the apparatus and method of operation disclosed herein where the filters while in use purifying the water may be simultaneously cleaned.

U.S. Pat. No. 1,012,808 discloses a means for purifying water wherein a solution of an iron compound capable of precipitation to form the coagulating agent is provided which includes electrolysis in the production of iron solvent.

U.S. Pat. No. 1,080,826 discloses a heating and purifying system for the preparation of water for boilers.

U.S. Pat. No. 3,563,879 discloses an electrolytic chlorine generator which utilizes the pressure of the chlorine generated for discharging chlorine gas into a water line of a swimming pool.

There is no teaching in any of these patents of the particular self cleaning filter arrangement in combination with an ionization and catalytic water converting apparatus as disclosed and claimed herein.

SUMMARY OF THE INVENTION

The development of a self cleaning filtering system in combination with an ionization technique has been given serious consideration for some time. The optimum characteristics for such a device must have an unusual set of properties. The filter must be functionally operable while being rinsed and/or backwashed, while the anode cells and catalytic converter remain functional.

It is, therefore, one object of this invention to provide a new and improved liquid purification apparatus and method of operation.

Another object of this invention is to provide a new and improved water purification apparatus for water towers and other industrial water cooling equipment.

A further object of this invention is to provide an improved water purification system in which the filters may be rinsed and/or backwashed while the apparatus, including the filters, remains functional in its operational mode.

A still further object of this invention is to provide an improved ionizational and filterational apparatus and method of operation having a reduced need for periodic cleaning or replacement of its filteration elements.

A still further object of this invention is to provide an improved controlled purificational apparatus that combines filteration, ionization and catalytic converter operations in an economical manner.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which.

DESCRIPTION OF THE PREFERRED EMBODIMENTS

Figure 1:
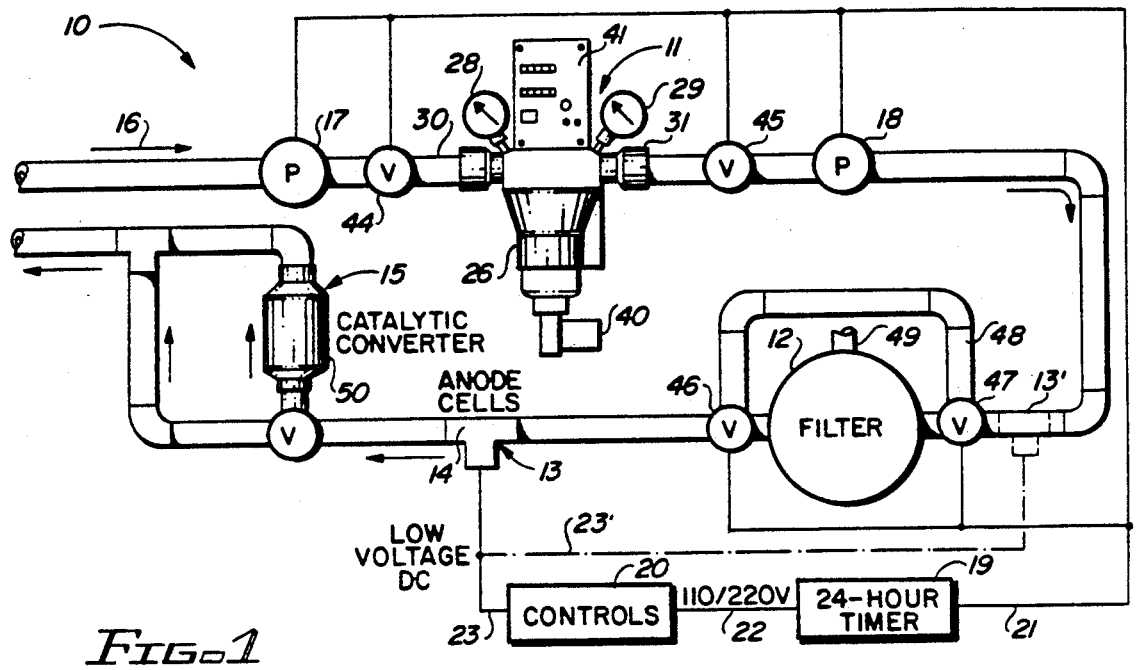
FIG. 1 is a schematic representation of a water purification apparatus connected to a water tower for a cooling system, boiler water filtering and water maintenance system or the like and embodying the invention.

Referring more particularly to the drawings by characters of reference, FIG. 1 discloses an improved liquid, such as for example, water purification system or apparatus 10 for the filteration, ionization and catalytically handling of water used in cooling towers, boilers and the like. It should be noted that specific language will be used to describe the apparatus but no limitation of the scope of the invention is thereby intended. Further application and modification of the principles of the invention as illustrated herein which would normally occur to one skilled in the art are contemplated and intended to fall within the scope of the claims forming a part hereof.

As shown in FIG. 1, the system or apparatus 10 comprises a pair of filtering means 11 and 12 connected in series with an ionization means 13 comprising a plurality of anode cells 14 and a catalytic water converter 15.

The apparatus is connected to a water tower, sump, boiler feed supply or other like source (not shown). In the drawing, the water of such a source is represented by arrow 16 and is transmitted under pressure through the apparatus by suitable pump means such as pumps 17 and 18. The ionization means 13 and pumps 17 and 18 are electrically controlled by a timer 19, control box 20 and electrical conductors 21, 22 and 23, as shown.

Filtering means 11 may comprise a structure manufactured and sold by Berkefeld of Anlagenbaugmbh, Postfach, 3100 Celle Fed. Rep. of Germany. This device comprises a cone shaped filter 25 for the removal of mechanical impurities like sand, oxidation products, dissolved sediments etc. contained in the water being treated which often cause malfunction of gates and adjusting valves.

For removal of these mechanical impurities, protection filters such as filtering means 11 are installed proceeding sensitive devices. The filtering means 11 is designed in such a way that small particles are retained in the water for hygienical reasons.

As noted from FIG. 1, raw water 16 flows through pump 17 and into housing 26 of filtering means 11 and through the hollow cone shaped filter 25 from its outside to its inside as shown by arrows 27. Filtered water flows out of housing 26 as pure water with the dirt particles retained in the tissue of filter 26.

Figure 5:
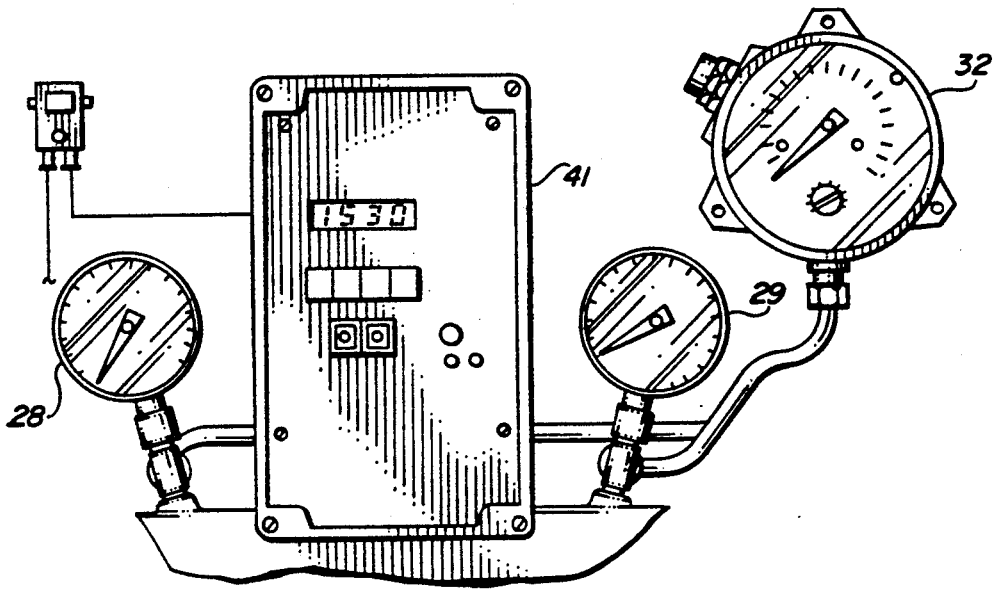
FIG. 5 illustrates a modification of FIGS. 2-4 wherein a differential pressure manometer is utilized.

A pair of pressure gauges 28 and 29, one positioned at each of the inlets and outlets 30 and 31, respectively, of housing 26 are used in differential pressure control of the cleaning cycles of the associated filter. An associated differential pressure manometer 32 shown in FIG. 5 notes the pressure differential between the pressure points of the filter sensed by gauges 28 and 29 and instigates various filter cleaning cycles as hereinafter explained.

When a predetermined pressure differential is noted between inlet and outlet 30 and 31 of housing 26 of filtering means 11, a valve means 35 is actuated causing a rinsing action of the cone shaped filter 25 to take place.

This valve means, as shown in FIGS. 1-4, comprises a valve stem 36 axially movable in housing 26 to move a valve 37 between an upper valve seat 38 and a lower valve seat 39 by a stepping motor 40 under control of the electronic control box mechanism 41. The stepping motor slowly rotates the valve stem to the left, as shown, to move the valve from one seated position to another in a predetermined sequence.

Figure 2:
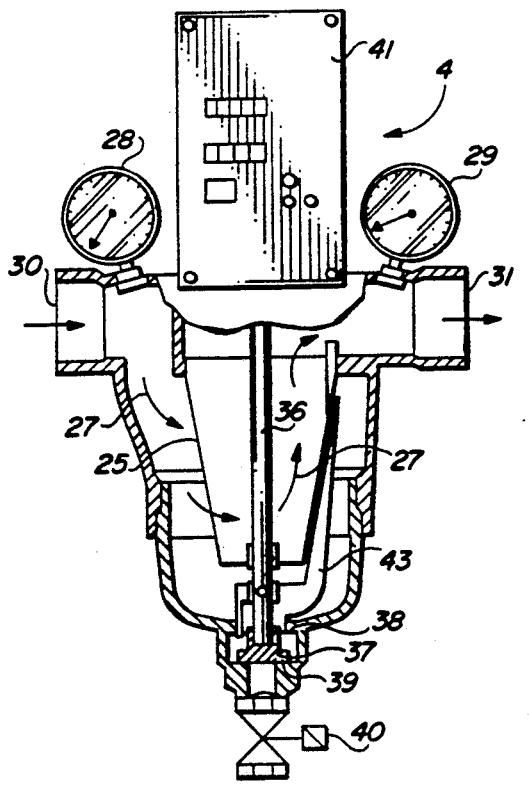
FIGS. 2, 3 and 4 illustrate cut away views of the protection filter shown in FIG. 1 illustrating the various operational positions during filtering, rinsing and backwashing functions.

FIGS. 1 and 2 show valve means 35 in a lower valve seated position. In this position, upon energization of pumps 17 and 18, water flows through entrance 30, cone shaped filter 25 from outside to inside and out of exit 31 of housing 26.

Time for rinsing the filter may be determined by preselection of the time and by determination of the day intervals set by control box mechanism 41. Furthermore, it is possible to start the rinsing by hand or by an external contact, i.e., differential pressure. The program rinsing time is not influenced by differential pressure release manometer 32.

Figure 3:
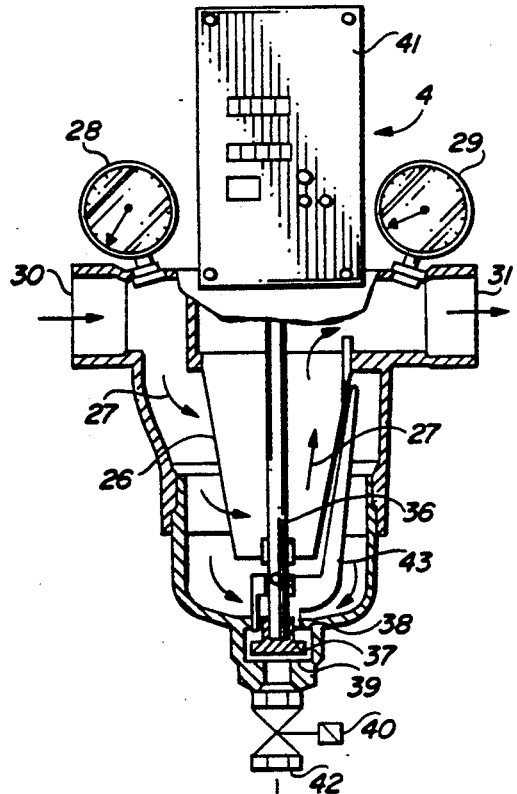

When the rinse is instigated by hand or the time sequence of control box mechanism 41, stepping motor 40 is energized to turn valve stem 36 to the left to move valve 37 to a position between upper and lower valve seats 38 and 39 thereby opening the lower sealing seat 39 with valve 37 being moved to the position shown in FIG. 3 which opens a drain channel 42. In this position with the upper and lower valve seals 38 and 39 open raw water flowing through entrance 30 may pass down over the outside surface of cone shaped filter 25, through upper and lower valve seats 38 and 39 and out drain channel 42 to a sewer (not shown). Simultaneously, the raw water from entrance 30 of housing 26 also flows from outside to inside of cone shaped filter 25 and through exit 31 of housing 26 as filtered, pure water.

Figure 4:
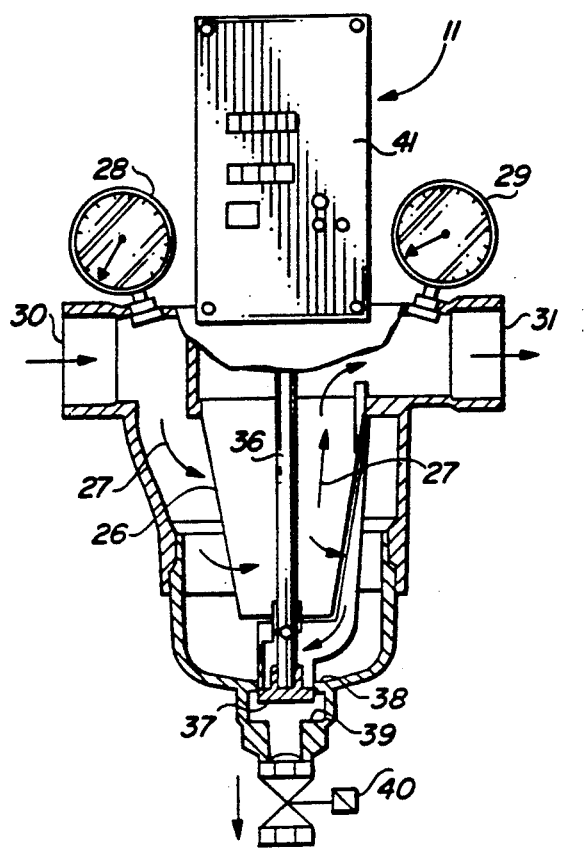

By further left turns of valve stem 36, such as three rotations thereof by stepping motor 40, upper valve seat 38 is closed by valve 37, as shown in FIG. 4, and the passageway of raw water from entranceway 30 out channel 42 is blocked.

With upper valve seat 38 closed by valve stem 36, water passing through cone shaped filter 25 from its outside to its inside is divided so that a first portion passes through exit 31 of housing 26 with a second portion passing from the inside of cone shaped filter 25 back through a portion of the surface of the filter and into a hollow stripper mechanism 43. The stripper mechanism lies close to the outside surface of cone shaped filter 25 and comprises a finger like mechanism which slowly rotates around the cone shaped filter upon further rotation of the stepping motor. The stripper mechanism provides a connection to drain channel 42. Thus, the cone shaped filter 25 is backwashed without interrupting the filtering function of the apparatus.

During backwash the pure water flows with high flow velocity through the filter tissue from the inside to the outside of the cone shaped configuration and into the stripper mechanism. By this action dirt particles are dislodged and drained off through the stripper mechanism 43 as the backwashing is carried out in the range of the stripper mechanism. Further slow turns of valve stem 36 to the left by the stepping motor are required for a complete cyclically cleansing of the filter cone.

The cleansing time can be adjusted by a potentiometer and should not exceed four minutes. This corresponds to approximately twelve turns to the left of the valve stem. If the filter tissue is exceptionally polluted, the backwashing time can be increased to a maximum of ten minutes which corresponds to approximately thirty turns to the left of the valve stem by the stepping motor.

When the filter cleaning function is over, the servomotor or stepping motor 41 is switched over to a reverse rotational operation by an impulse from control box mechanism 41. This action causes the valve 37 to close and seat in its lower seat 39, as shown in FIGS. 1 and 2, and the apparatus is again filtering the full stream of raw or recycled water. A luminous diode on the control box mechanism 41 will indicate this condition.

If desired, solenoid controls valves 44 and 45 may be placed in the water flow system upstream and downstream of filtering means 11 which are controlled simultaneously with the energization of pumps 17 and 18 for safety purposes.

Filtering means 12 comprises a granular type of filtration system, the Berkefeld Securquick Type 5. This filters down to 5 microns or better. This filter arrangement is provided with solenoid valves 46 and 47 one on each side of it which are energized when backwashing in the usual manner to bypass through pipe line 48 a part or portion of the recirculated water of the system around filtering means 12, the remainder may be used for backwashing through the filtering material of filtering means 12 and out of drain line 49. The backwashing of this filter may be programmed to operate simultaneously with the backwashing of filtering means 11 or at any other suitable time.

It should be noted that the ionization means 13 and its anode cells 14 are automatically controlled electronic devices which control the growth of algae and bacteria in the water towers as an alternative to a chemical system. As the temperature of the water rises, algae and bacteria cultivate and reproduce more rapidly. To compensate for more contaminants, the ion output of the ionizer is increased. In cooler water, algae and bacteria are more dormant, thus allowing for a reduction of ion output and extension of the life of the anode cells.

The electronic circuitry for the anode cells is enclosed in the waterproof control box 20 and may comprise state of the art computer assisted functions. The power output is a low voltage (12-16 volts DC) with the anodes comprising a combination of silver and copper alloys which are installed in the water flow line as shown in full lines downstream of filtering means 12 or as shown in dash lines and identified by reference characters 13' and 23' upstream of filtering means 12.

As known, an atom is electrically neutral. When one or more electrons are either removed from or added to it, the atom becomes electrically charged and is then called an ion. This process is called "ionization".

If a voltage is applied across two metal electrodes in a solution, negative ions will move to the positive electrode and positive ions will move to the negative electrode. This is the basis of electrolysis. In theory, the water is taking on both copper and silver ions and giving up calcium and disclosed solids. This is accomplished with between 80 and 450 milliams of DC current.

The EPA recently stated that because of its strong bacteriacidal action, silver can be effectively used as a water disinfectant. Extremely small doses of silver are sufficient to sterilize water with no detrimental effects on humans.

The U. S. Department of Agriculture has stated that copper is an algaecide and disinfectant in water supplies. Copper is widely used for control of algae in water supply reservoirs and in recreational lakes.

The catalytic water converter 15, i.e., alloy conditioner, comprises a device for applying the catalytic properties of several different metallic elements to produce electro-chemical changes to the ions and molecules in the water through direct contact with these in the water solution.

It is essentially used to inhibit scale buildup, commonly called "lime" or "rust". This occurs through the reduction in hydrogen bonding between the $H_2O$ molecules resulting from the increased electron count in the conditioned water. In other words, the $H_2O$ molecule is free of adhesive compounds and the water is wetter.

One satisfactory catalytic water conditioner for use in the disclosed apparatus is that manufactured and sold by Fre-Flo Products Company, Inc. of Wichita, Kansas 67208.

Figure 6:
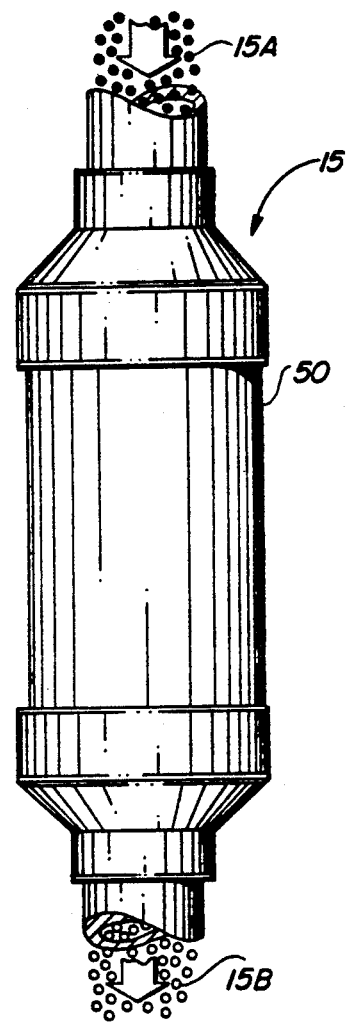
FIG. 6 is a broken away view of the catalytic converter shown in FIG. 1.

The catalytic converter 15 as shown in FIGS. 1 and 6 having inlet and outlet orifices 15A and 15B comprise a housing or core 50 formed of many precious and semi-precious metals that is configured to prevent flow restriction therethrough while providing a high degree of turbulence and increased physical contact between the ions and molecules in the water and the core itself in order to maximize catalytic efficiency.

All metals give up electrons easily in their outer atomic shell thus acting as a catalyst with gold being the most electron-acquisitive of the metals and has an electronegativity of 2.4 on the Electronegativity Scale. The most aggressive (electron-acquisitive) elements of the ion metals are fluorine at 4.0 on the Electronegativity Scale with oxygen at 3.5 and chlorine at 3.0.

The electronegativity of the core alloy is less than the overall electronegativity of the water solution. Therefore, the core loses (gives up) more electrons than it acquires to elements such as hydrogen (H) ion which have an electronegativity of 2.1 and to ionic compounds (radicals) such as $SO_4^{2-}$ and $CO_3^{2-}$ which have higher electronegativities than the core alloy.

Thus, electrons are drawn into the water solution because the solution contains ions that are more electronegative than the catalytic alloy conditioner core 50. In terms of the Electromotive Series, catalytic alloy conditioner core 50 contains elements which have higher oxidation potentials than ions in the water solution.

Operation

In normal operation pumps 17 and 18 draw water 16 from any suitable source such as a cooling tower, or other cooling equipment or the like forcing same through filtering means 11 and 12, ionization means 13 and catalytic water converter 15 and back to its source. The control box mechanism 41 determines whether a filter rinsing or backwashing operation is to take place.

If a rinsing and/or backwashing operation is to take place the filter structure operates as heretofore described while the normal water treatment function of apparatus 10 continues. Normal function of apparatus 10 also continues when part of the water flowing through solenoid valves 46 and 47 of apparatus 10 is used for backwashing filtering means 12.

Coarse filtering means 11 is necessary to remove suspended particles larger than 150 microns which would otherwise cause problems in fine filtering means 12 which filters particles large than 5 microns in size.

Mineral suspension and micro-organism growth is retarded by the ionization of means 13.

Although determination of optimum ration of flow between the ionizing and filter paths may be empirically determined, it is contemplated that the same may be computerized and automated, responsive to the various pressure and temperature sensors in the system.

It should be noted that the proper pH is accomplished through the use of a pH monitor (The Omega PHCN-30) and a chemical pump set up. The pH control is made by Omega Engineering Inc. in Stamford, CT.

Although but one embodiment of the present invention has been illustrated and described, it will be apparent to those skilled in the art that various changes and modifications may be made therein without departing from the spirit of the invention or from the scope of the appended claims.

What is claimed is:

1. A liquid treatment apparatus comprising:
   pump means for circulating liquid from an inlet port to an outlet port,
   a filtering means for receiving said liquid and discharging filtered liquid therefrom,
   said filtering means comprising a first filter for removing particles larger than a first predetermined size and a second filter for sequentially removing particles larger than a second predetermined size,
   said first filter comprising a hollow cone shaped configuration having a porous surface through which said liquid is passed to separate it from it matter held in suspension larger than said first predetermined size,
   valve means upstream of said first filter for diverting a part of said liquid over the outside surface of said first filter for rinsing it and discharging said portion to a drain,
   ionizing means for receiving and passing therethrough said filtered liquid,
   said ionizing means comprising copper/silver alloy electrode for passing electrical current therebetween through the filtered liquid from one to the other of said electrodes, and
   a catalytic water converter connected to receive the ionized liquid from said ionizing means, said converter electro-chemically changing the ion and molecule composition of the ionized liquid passing therethrough prior to discharging it through said outlet port.

2. The liquid treatment apparatus set forth in claim 1 wherein:
   said valve means comprises a stepping motor.

3. The liquid treatment apparatus set forth in claim 1 in further combination with:
   a first means for receiving a part of said liquid passed into the hollow of said first filter and diverting it outwardly of the inside surface of said first filter and discharging said portion to a drain.

4. The liquid treatment apparatus set forth in claim 1 wherein:
   said first filter comprises a hollow stripper mechanism mounted on its outside surface for rotation there over, and
   a second means for receiving part of said liquid passed into the hollow of said first filter for diverting it outwardly of the inside surface of said first filter and discharging it to a drain.

5. The liquid treatment apparatus set forth in claim 1 wherein:
   said first predetermined size comprises particles larger than 150 microns, and
   said second predetermined size comprises particles larger than one micron.

6. The liquid treatment apparatus set forth in claim 1 wherein:
   said pump means comprises at least a pair of pumps positioned one before each of said first and second filters for forcing liquid therethrough.

7. A liquid treatment method comprising the steps of:
   pumping a liquid received from an inlet through a coarse filter wherein solids larger than a first size are retained,
   diverting a first portion of said liquid to be pumped through said coarse filter over the surface of said coarse filter and to a drain while a second portion is simultaneously discharged from said coarse filter to said fine filter,
   discharging the filtered liquid into a fine filter wherein solids larger than a second size are retained,
   discharging the liquid filtered by said fine filter through an ionizing means,
   discharging the liquid filtered by said ionizing means through a catalytic water converter wherein the ion and molecule composition of the ionized liquid is changed, and
   discharging the converter treated liquid to an outlet port.

8. The liquid treatment method set forth in claim 7 in further combination with the steps of:
   diverting a first portion of said liquid pumped through said coarse filter back through said coarse filter to a drain while simultaneously discharging a second portion of said filtered liquid to said fine filter.

9. The liquid treatment method set forth in claim 7 in further combination with the steps of:
   monitoring the pressure on both sides of said coarse filter, and
   diverting a first portion of said liquid pumped through said coarse filter back through said coarse filter and to a drain upon receipt of a signal from the monitoring means while a second portion of said filtered liquid is simultaneously discharged to said fine filter.

* * * * *

UNITED STATES PATENT OFFICE
CERTIFICATE OF CORRECTION

Patent No. 5,013,415               Dated May 7, 1991

Inventor(s) Wilbur Hudson

It is certified that error appears in the above-identified patent and that said Letters Patent is hereby corrected as shown below:

Column 6:

Claim 1, line 22 - delete "electrode" and substitute

---electrodes---.

Signed and Sealed this

Twelfth Day of January, 1993

*Attest:*

DOUGLAS B. COMER

*Attesting Officer*          *Acting Commissioner of Patents and Trademarks*